Dec. 16, 1958  R. R. GRIFFITH, JR  2,864,228
NUT GATHERER
Filed May 23, 1957
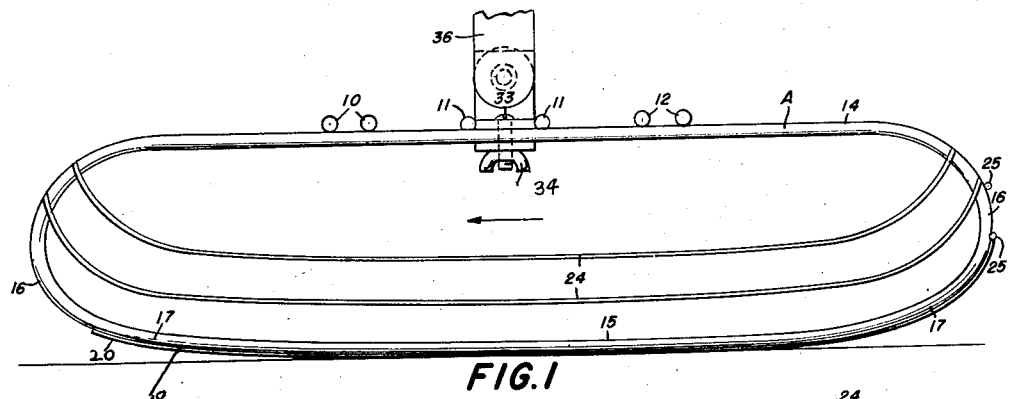
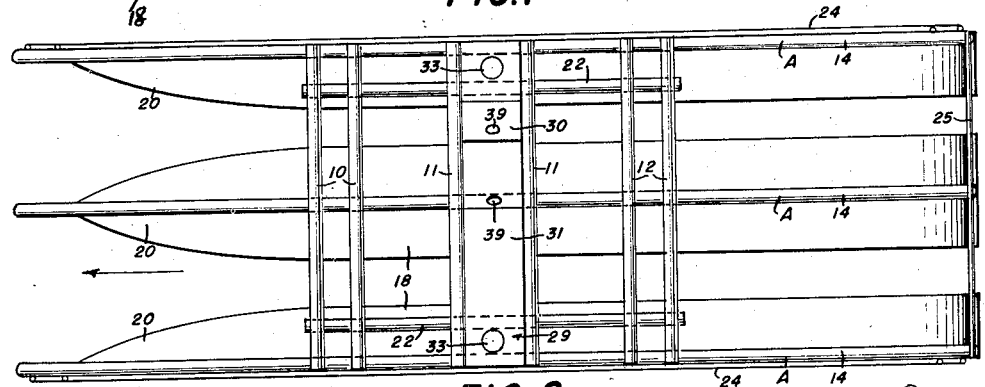
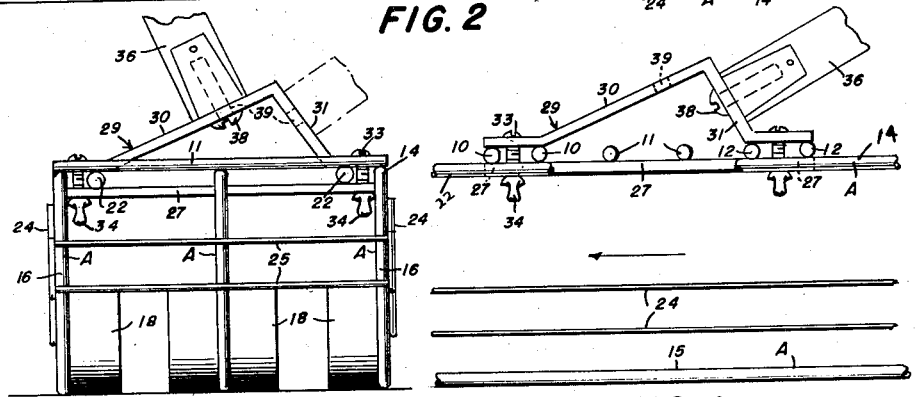
INVENTOR
*RAY R. GRIFFITH, JR.*
BY *Estabrook and Estabrook*
ATTORNEYS

UNITED STATES PATENT OFFICE 2,864,228

NUT GATHERER

Ray R. Griffith, Jr., Columbia, Miss.

Application May 23, 1957, Serial No. 661,135

2 Claims. (Cl. 56—328)

This invention relates to an improvement in nut gatherers or pickers, and particularly for gathering nuts, fruit, etc., lying on the ground, although it is adapted for gathering fruit on small bushes.

The invention consists of a gatherer so constructed that nuts can be collected by moving it along the ground, and leaves and foreign matter will be separated from the nuts, and such foreign matter that is gathered can be readily discharged upon shaking the gatherer.

In the accompanying drawing:

Fig. 1 is a fragmentary view in side elevation;

Fig. 2 is a top plan view;

Fig. 3 is a fragmentary rear end view in elevation; and

Fig. 4 is a fragmentary view in side elevation similar to Fig. 1 showing the handle bracket mounted longitudinally of the gatherer.

The invention consists of a plurality of substantially oval-shaped rings formed from wire rods to provide a series of parallel runners A arranged in equally spaced parallel relation. Each of the runners A consists of horizontal upper and lower run portions 14 and 15 and curved end portions 16 which latter are integral with said upper and lower portions. The lower run portion 15 is preferably curved adjacent its ends as at 17 to permit the runner to be freely moved over the ground and tilted to accommodate the contour of the ground.

The several runners A are connected together by a plurality of bars 10, 11, and 12 suitably secured to the horizontal upper run portions 14, and arranged transversely of the several runners A for retaining the runners in a rigidly and equally spaced relation and allowing the lower run portions 15 to have a certain flexibility with respect to each other.

Attached to the lower run portion of each runner A, is a picker plate or slat 18. There are three runners A, and the outermost runners are each connected along one edge of a slat 18, so that the picker slat extends inwardly of the outermost runners toward the intermediate runner. The intermediate picker slat 18 is connected to the intermediate runner with the runner located centrally and axially lengthwise of the slat, so that the intermediate slat projects laterally from both sides of the runner toward the slats attached to the outermost runners. The picker slats 18 extend lengthwise of the runners A and the outer longitudinal edges of the intermediate slat are disposed in spaced relation to the edges of the outermost slats. The spacing between the adjoining slats is such that the nut or fruit will not pass through the space between the adjoining edges of the slats, but the nut or fruit can span the space and be supported by the adjoining slats. The several slats 18 have rounded or curved edges 20 at their forward ends providing a wide mouth or entrance for the nut or fruit being gathered to pass onto the slats as the picker is moved over the ground or surface.

The slats 18 do not extend the entire length of the runners A, but terminate short of the length of the run portions 15 at the forward or collecting end of the gatherer or picker where the run portions 15 are curved as at 17 so that they have a slight elevation at the mouth or entrance end where the slats are curved at 20. This affords the gatherer or picker to be tilted forwardly to accommodate the contour of the ground traversed in collecting the nuts.

To afford additional rigidity to the picker the several bars 10, 11 and 12 are connected by longitudinal bars 22. Connecting the curved ends 16 of the outermost runners are a series of wires 24, suitably spaced, which extend lengthwise of the runners to provide sides for the picker or gatherer to retain the nuts and fruit therein. Rods or wires 25 are connected to the curved ends 16 at the rear portion of the runners to retain the material gathered in the picker.

As shown in Figs. 1 to 3, a plate 27 is mounted transversely of and beneath the upper run portions 14 of the runners and the longitudinal bars 22. An angle bracket 29 having two opposed inclined portions 30 and 31, with inclined portion 31 being at a greater oblique angle with respect to the horizontal than the portion 30, is mounted on the upper run 14 of the runners and the longitudinal bars 22 and disposed over the plate 27 and between the bars 11. Bolts 33 extend through the plate 27 and bracket 29 between outer runs 14 and bars 22, and wing nuts 34 are mounted on the bolts for connecting the plate and bracket to the gatherer.

A handle 36 is attached to either inclined portion 30, 31 by a screw bolt 38 passing through a hole 39 in either portion 30 or 31 and into the lower end of the handle so that the handle extends laterally at a right angle to the gatherer so that it can be grasped by the operator for moving the gatherer along the ground. This arrangement makes provision for the handle 36 to be positioned on either side of the gatherer and be disposed at the angle to suit the operator. This means, of course, that the bracket 29 can be mounted on the plate 27 so that the angle or inclined portions 30 and 31 can be transposed or reversed from that shown in Fig. 3 causing the portion 31 to be located in the position now occupied by portion 30.

With the handle 36 disposed laterally of the runners and to one side of the gatherer it is of great advantage to the operator in manipulating the gatherer over uneven surfaces and in directing the nuts onto the slats where they will be caused to roll back into the gatherer until it is filled or has sufficient quantity to be discharged into a receptacle with the spacing of the slats and the wires 24 along the sides as well as the bars across the back of the gatherer leaves and foreign matter can be quickly ejected by shaking the gatherer. Also upon raising the gatherer from the ground a great deal of the foreign matter will fall out so that in most instances the nuts collected are free of all foreign matter. The gatherer will pick up the nuts which may be among the leaves and grass without collecting leaves or grass to any great extent and due to the bowed or curved surface of the lower horizontal portion of the runners it is possible to tilt the gatherer to accommodate for uneven surfaces of the ground and, furthermore, the lower portions of the runners are capable of having a certain amount of flexibility and movement with respect to each other to accommodate any uneven surface of the ground and to allow foreign matter to be separated from the nuts without the nuts being discharged from the gatherer. Also with the handle disposed at the side of the gatherer the operator can always judge the amount of pressure to be applied thereto to cause the nuts to be directed into the gatherer.

In Fig. 4 the bracket 29 and plate 27 are disposed longitudinally of the gatherer so that they are connected by means of the bolts 33 and nuts 34 to the horizontal bars 10 and 12. The bracket 29 can be positioned so as to get either the portion 31 or 30 directed toward the rear of the runners so that the handle can be connected to either of these members 30 or 31 and be arranged to project toward the rear of the runners in operating the device in gathereing the nuts.

I claim:

1. A nut gatherer, comprising a plurality of flexible ring-shaped runners each having an upper run portion and a lower run portion, said runners being arranged in spaced parallel relation, a bar extending transversely of said parallel arranged ring-shaped runners and connected to each of said upper run portions of said runners for maintaining said upper run portions of said several runners in parallel spaced relation and permitting said lower run portions to have flexibility of movement with respect to each other transversely of said gatherer when moved over the ground to conform to the contour of the ground, slats connected to and extending axially of and beneath each of said lower run portions, said slats being arranged in spaced relation to each other, and a handle connected to said runners for moving the gatherer over the ground.

2. A nut gatherer, comprising a plurality of flexible ring-shaped runners each having an upper run portion and a lower run portion, said runners being arranged in spaced parallel relation, a bar extending transversely of said parallel arranged ring-shaped runners and connected to each of said upper run portions of said runners for maintaining said upper run portions of said several runners in parallel relation and permitting said lower run portions to have flexibility of movement with respect to each other transversely of said gatherer when moved over the ground to conform to the contour of the ground, slats connected to and extending axially of and beneath each of said lower run portions, said slats being arranged in spaced relation to each other, a bracket having two inclined portions arranged in opposed relation with one inclined portion being at a greater oblique angle with respect to the horizontal than the other inclined portion and mounted on said upper run portions, and a handle engageable with either of said inclined bracket portions for moving the gatherer over the ground.

References Cited in the file of this patent

UNITED STATES PATENTS

| | | |
|---|---|---|
| 433,178 | Lumbert | July 29, 1890 |
| 649,377 | Waters | May 8, 1900 |
| 1,793,464 | Chandler | Feb. 24, 1931 |
| 2,616,236 | Hartley | Nov. 4, 1952 |